(No Model.)

J. F. McELROY.
ELECTRIC RADIATOR.

No. 598,639. Patented Feb. 8, 1898.

Witnesses:
John W. Fisher
Fred W. Cameron

Inventor,
James F. McElroy.
by Ward & Cameron
Attorneys

UNITED STATES PATENT OFFICE.

JAMES F. McELROY, OF ALBANY, NEW YORK, ASSIGNOR TO THE CONSOLIDATED CAR-HEATING COMPANY, OF SAME PLACE.

ELECTRIC RADIATOR.

SPECIFICATION forming part of Letters Patent No. 598,639, dated February 8, 1898.

Application filed January 25, 1895. Serial No. 536,207. (No model.)

*To all whom it may concern:*

Be it known that I, JAMES F. McELROY, a citizen of the United States, residing in the city and county of Albany, State of New York, have invented a new and useful Improvement in Electric Radiators, of which the following is a specification.

My invention relates to improvements in electric heating apparatus; and the object of my invention is to provide an electric radiator which shall be compact in form, easily adjusted, positive in operation, and which is particularly adapted for use in electric cars, where it may be placed upon the riser of the seat and take up very little room. I accomplish this object by means of the mechanism illustrated in the accompanying drawings, in which—

Figure 1:
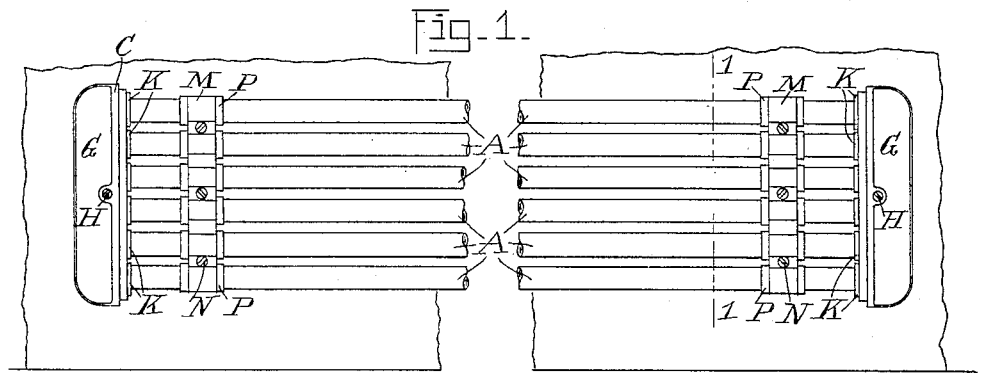
Figures 2, 3:
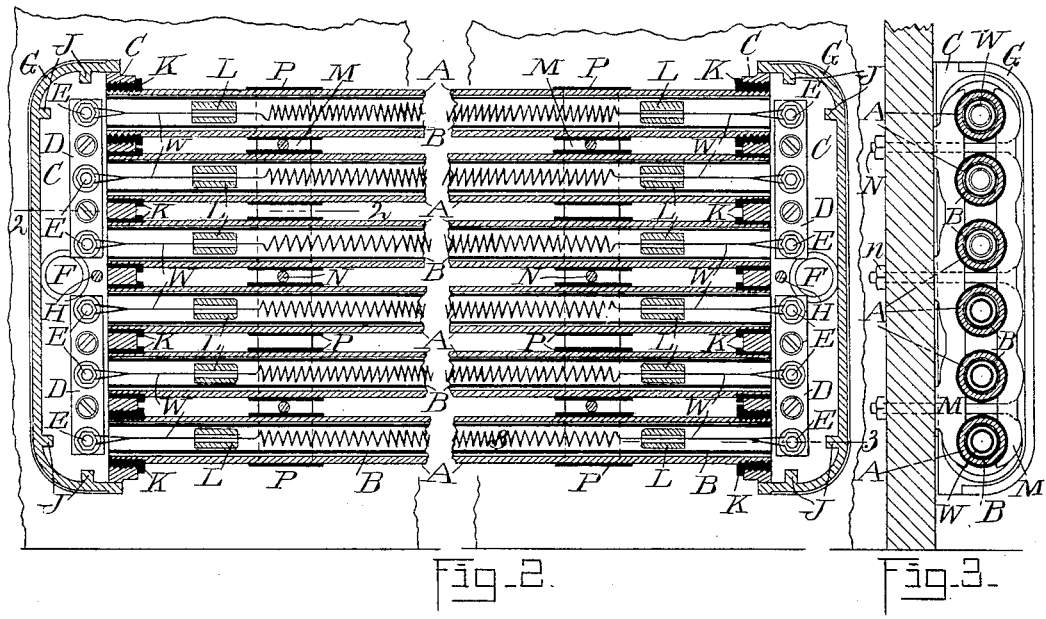
Figure 4:
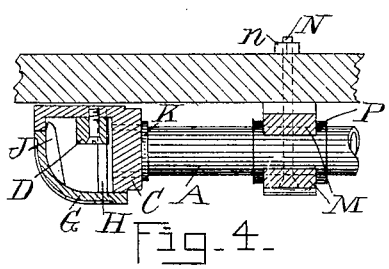
Figure 5:
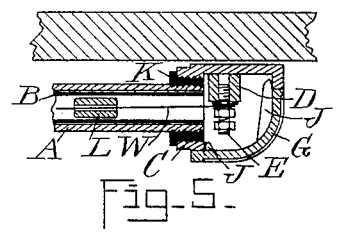

Figure 1 is a front elevation. Fig. 2 is a longitudinal section. Fig. 3 is a cross-section along the line 1 1 on Fig. 1. Fig. 4 is a section along the line 2 2 on Fig. 2, and Fig. 5 is a section along the line 3 3 on Fig. 2.

Similar letters refer to similar parts throughout the several views.

A A represent a series of iron pipes or small boiler-tubes. Within each of the pipes A, I place an asbestos tube B. These pipes are grouped so as to form radiators having any number of pipes desired, preferably six in a set, the pipes being attached at each end in any convenient manner to a manifold C C.

I have shown the pipes secured to the manifold by placing a right-hand thread upon one end of each of the outside pipes of the set and the left-hand thread on the opposite end of each of said pipes, the intervening pipes making a slip-joint with the manifold. In this way by turning the outside pipes they will become fastened and the intervening pipes held securely in position.

To the manifold C, I secure insulating-blocks D D, and by means of binding-screws E E contacts are made with the connecting and resistance wires. Through the opening F F in each manifold the wires may be passed through the woodwork to which the radiator is secured to the source of electric supply. It is evident that these heaters may be all connected in multiple or in any other combinations. The manifold C, which confines the ends of the heaters, is preferably made with a removable portion or cap G, which is held in position by means of the screw H (see Fig. 4) and the lugs J J in such a manner that it may be removed for the connecting up of the different pipes in a group without difficulty.

For the purpose of securing insulation of all parts of the apparatus, that the different pipes may be insulated from each other and insulated from the manifolds and prevent danger from short-circuiting, I place an insulating-bushing K K between the ends of each pipe and the manifold, as shown by the heavy line. This is not absolutely necessary, and I do not limit myself to this construction. I place insulating-blocks L L, usually constructed of porcelain, in each pipe separating the end of the pipe from the manifold for the purpose of preventing the heat being communicated from the space within the pipe to the manifold. From the contacts E E, I place a wire W through each pipe, which wire passes through the insulated block L, after which it is coiled in such a manner that contiguous layers do not come into contact until it reaches the block at the other end of the pipe, when it is straightened out, passing through the block to the contact. This wire is kept under constant tension by the spring of the coil.

For the purpose of securing the radiator to the riser of a car-seat or other support I preferably use a clamp M and usually insert between the pipes and the clamp insulating material P, usually sheet-asbestos, the clamp being secured to the support by means of the bolts N and nuts *n* or in any suitable manner. As thus arranged the contraction and expansion of the pipes are provided for, the manifolds being free from the support and the pipes capable of longitudinal motion in the clamp.

What I claim as my invention, and desire to secure by Letters Patent, is—

1. In an electric radiator, the combination of a series of pipes, a tube of non-conducting material placed in each of said pipes, a manifold at each end of said pipes, a removable cap for each of said manifolds, a right-hand thread cut upon one end of the outside pipes of the series, a left-hand thread cut on the opposite end of each of said outside pipes, corresponding threads in the manifolds with which said pipes are connected, the intervening pipes in said series arranged to make slip-joints with the manifolds in such a manner that by turning the outside pipes of the series they will become fastened and the intervening pipes held in position in the manifolds, insulating-blocks secured to the manifolds, binding-screws connected with said insulating-blocks, a wire coiled throughout part of its length extending through each of said tubes, a non-conducting block placed near each end of each of said tubes, said wire passing through said non-conducting block and attached to said binding-screws, substantially as described.

2. In an electric radiator, a frame consisting of two manifolds, a series of pipes engaging with and extending between said manifolds, some of the pipes rigidly connected to said manifolds, the other pipes in the frame held loosely in the manifolds, a wire passing through the entire length of each of said pipes, said wire coiled part of its length, an insulating-block placed within each pipe near each end thereof, substantially as described and for the purpose set forth.

3. In an electric radiator, the combination of two manifolds, a series of pipes extending from one manifold to the other, the ends of some of said pipes held rigidly within the manifold, the remainder of said pipes held loosely in the manifold, wires extending through each of said pipes, so arranged that the contraction and expansion may take place when some of the wires in the pipes are in circuit and others are out of circuit without binding or racking the manifolds, substantially as described.

JAMES F. McELROY.

Witnesses:
   H. J. NODINE,
   W. P. EDDY.